(12) United States Patent
Hommura et al.

(10) Patent No.: US 7,838,167 B2
(45) Date of Patent: Nov. 23, 2010

(54) ELECTROLYTE POLYMER FOR FUEL CELLS, PROCESS FOR ITS PRODUCTION, ELECTROLYTE MEMBRANE AND MEMBRANE/ELECTRODE ASSEMBLY

(75) Inventors: Satoru Hommura, Yokohama (JP); Tetsuji Shimohira, Yokohama (JP)

(73) Assignee: Asahi Glass Company, Limited, Tokyo (JP)

(*) Notice: Subject to any disclaimer, the term of this patent is extended or adjusted under 35 U.S.C. 154(b) by 951 days.

(21) Appl. No.: 11/675,863

(22) Filed: Feb. 16, 2007

(65) Prior Publication Data
US 2007/0141427 A1 Jun. 21, 2007

Related U.S. Application Data (63) Continuation of application No. PCT/JP2005/014953, filed on Aug. 16, 2005.

(30) Foreign Application Priority Data
Aug. 18, 2004 (JP) .............................. 2004-238460

(51) Int. Cl.
H01M 8/10 (2006.01)
B01J 49/00 (2006.01)

(52) U.S. Cl. .............................. 429/494; 521/27; 521/30
(58) Field of Classification Search ................... 429/33; 521/25, 27, 30
See application file for complete search history.

(56) References Cited

U.S. PATENT DOCUMENTS

| | | | |
|---|---|---|---|
| 3,085,083 | A | 4/1963 | Schreyer |
| 3,242,218 | A | 3/1966 | Miller |
| 4,626,587 | A | 12/1986 | Morgan et al. |
| 4,743,658 | A | 5/1988 | Imbalzano et al. |
| 4,977,221 | A | 12/1990 | Yoshimura et al. |
| 5,417,832 | A | 5/1995 | Pellegrino et al. |
| 6,197,147 | B1 | 3/2001 | Bönsel et al. |
| 6,423,784 | B1 | 7/2002 | Hamrock et al. |
| 6,451,962 | B1 | 9/2002 | Hiraga et al. |
| 6,465,120 | B1 | 10/2002 | Akita et al. |
| 7,429,428 | B2 * | 9/2008 | Watakabe .................... 429/33 |
| 2003/0175578 | A1 | 9/2003 | Kim |

FOREIGN PATENT DOCUMENTS

| | | |
|---|---|---|
| EP | 0 498 076 | 8/1992 |
| EP | 1 583 106 A1 | 10/2005 |
| JP | 46-23245 | 7/1971 |
| JP | 4-83 | 1/1992 |
| JP | 4-366137 | 12/1992 |
| JP | 5-255522 | 10/1993 |
| JP | 6-260185 | 9/1994 |
| JP | 7-5743 | 1/1995 |
| JP | 7-30134 | 4/1995 |
| JP | 10-87746 | 4/1998 |
| JP | 2000-503158 | 3/2000 |
| JP | 2000-198813 | 7/2000 |
| JP | 2001-81220 | 3/2001 |
| JP | 2002-249585 | 9/2002 |
| JP | 2003-517054 | 5/2003 |
| JP | 2003-272640 | 9/2003 |
| JP | 2003-321558 | * 11/2003 |
| JP | 2004-83663 | 3/2004 |
| WO | WO 98/16581 | 4/1998 |

* cited by examiner

*Primary Examiner*—Patrick Ryan
*Assistant Examiner*—Thomas H. Parsons
(74) *Attorney, Agent, or Firm*—Oblon, Spivak, McClelland, Maier & Neustadt, L.L.P.

(57) ABSTRACT

To provide an electrolyte polymer for fuel cells, an electrolyte membrane, a membrane/electrode assembly for fuel cells excellent in the durability.

An electrolyte polymer for fuel cells made of a perfluorocarbon polymer having ion exchange groups (which may contain etheric oxygen atoms), characterized in that the value calculated by dividing an absorption area $S_{CH}$ derived mainly from a C—H bond in the range of from 3,100 cm$^{-1}$ to 2,800 cm$^{-1}$ by an absorption area $S_{CF}$ derived mainly from a C—F bond in the range of from 2,700 cm$^{-1}$ to 2,000 cm$^{-1}$, as measured by means of infrared spectrophotometry, is less than 0.005, an electrolyte membrane and a membrane/electrode assembly.

24 Claims, 2 Drawing Sheets

ELECTROLYTE POLYMER FOR FUEL CELLS, PROCESS FOR ITS PRODUCTION, ELECTROLYTE MEMBRANE AND MEMBRANE/ELECTRODE ASSEMBLY

TECHNICAL FIELD

The present invention relates to an electrolyte polymer for fuel cells, an electrolyte membrane and a membrane/electrode assembly.

BACKGROUND ART

Attention has been drawn to a hydrogen-oxygen fuel cell as a power generating system which presents substantially no adverse effects on the global environment because in principle, its reaction product is water only. Polymer electrolyte fuel cells were once mounted on spaceships in the Gemini project and the Biosatellite project, but their power densities at the time were low. Later, more efficient alkaline fuel cells were developed and have dominated the fuel cell applications in space including space shuttles in current use.

Meanwhile, with the recent technological progress, attention has been drawn to polymer fuel cells again for the following two reasons: (1) Highly conductive membranes have been developed as polymer electrolytes and (2) it has been made possible to impart extremely high activity to the catalysts for use in gas diffusion electrodes by using carbon as the support and incorporating an ion exchange resin in the gas diffusion electrodes so as to be coated with the ion exchange resin.

However, a perfluoropolymer having sulfonic groups to be used as a polymer contained in a membrane and an electrode usually has unstable terminal groups with a C—H bond, such as —COOH groups, —CF=$CF_2$ groups, —COF groups and —$CF_2$H groups at some molecular chain terminals, and therefore, there was such a problem that a polymer gradually decomposes during long-term fuel cell operations, followed by decreasing the power generation voltage. In addition, there was such a problem that the fuel cell operation cannot be conducted because decrease of the mechanical strength due to the polymer decomposition, locally causes pinholes, breaking, abrasion or the like.

The above problems are caused by the presence of such unstable functional groups at some molecular chain terminals of a fluorine-containing polymer, and as methods for stabilizing such molecular chain terminals, for example, the following methods have been proposed.

A method of hydrothermal treatment of a tetrafluoroethylene/hexafluoropropylene copolymer (hereinafter referred to as a TFE/HFP copolymer) at a high temperature to convert —COOH groups into —$CF_2$H groups (See Patent Document 1).

A method of decarboxination and fluorination of a fluorine-containing polyether having a low molecular weight by using fluorine gas in a liquid state or a state as dissolved in an inert solvent, to stabilize terminal groups (See Patent Document 2).

A method of shearing a TFE/HFP copolymer by a twin-screw extruder at a high temperature, followed by treating with fluorine gas (See Patent Document 3).

A method of treating a tetrafluoroethylene/perfluoroalkyl vinyl ether copolymer (hereinafter referred to as a TFE/PFVE copolymer) by contacting it with fluorine gas in the form of pellets (See Patent Document 4).

A method of treating a TFE/PFVE copolymer by contacting it with fluorine gas in the form of granules (See Patent Document 5).

A method of treating a TFE/HFP copolymer or a TFE/PFVE copolymer by contacting it with fluorine gas in the form of a pulverized product having an average particle diameter of from 5 to 500 μm (See Patent Document 6).

A method of treating a TFE/PSVE copolymer by stirring a polymerization product obtained by solution polymerization or suspension polymerization in water, followed by contacting the resulting spherical granules having an average particle diameter of from 1 to 5 mm with fluorine gas (See Patent Document 7).

A method of subjecting a TFE/HFP copolymer or a TFE/PFVE copolymer to reactive heat treatment with oxygen and water by a kneader (See Patent Document 8).

A method of carrying out treatment of a TFE/HFP copolymer or a TFE/PFVE copolymer by melt-kneading in the presence of oxygen and melt-kneading in the presence of water in a single kneader (See Patent Document 9).

However, such methods are not designed for treatment of a polymer having ion exchange groups or their precursor groups, but designed for stability of a fluorine-containing polymer at the time of heat forming. Here, in this specification, precursor groups for ion exchange groups mean groups convertible into ion exchange groups by e.g. hydrolysis, and precursor groups for sulfonic groups may, for example, be —$SO_2$F groups or —$SO_2$Cl groups.

As a method of improving the stability of a fluorine-containing polymer containing ion exchange groups or their precursor groups, a treating method has been proposed wherein a perfluoropolymer having sulfonic groups is put in a shaking tube coated with nickel or a stainless steel container and contacted with fluorine gas (See Patent Document 10).

It is possible to reduce unstable terminals by means of such treatment with fluorine gas, whereby it is effective to improve the durability of the polymer. However, such treatment may sometimes be insufficient by itself depending upon the purpose.

Patent Document 1: U.S. Pat. No. 3,085,083 (Claim 1 and lines 24 to 66 in column 2)
Patent Document 2: U.S. Pat. No. 3,242,218 (Claim 1)
Patent Document 3: U.S. Pat. No. 4,626,587 (Claims 1 to 3)
Patent Document 4: JP-B-4-83 (Line 20 on page 4 to line 14 on page 5)
Patent document 5: JP-B-7-30134 (Claim 1)
Patent Document 6: JP-B-7-5743 (Claims 1 to 3)
Patent Document 7: JP-A-10-87746 (Claim 1)
Patent Document 8: JP-A-2000-198813 (Claim 1)
Patent Document 9: JP-A-2002-249585 (Claims 1 to 2)
Patent Document 10: JP-B-46-23245 (Claim 1)

DISCLOSURE OF THE INVENTION

Object to be Accomplished by the Invention

Accordingly, in view of the above-mentioned problems of the prior art, it is an object of the present invention to provide an electrolyte polymer and electrolyte membrane, excellent in the durability, and to provide a stable and high power fuel cell.

Means to Accomplish the Object

The present invention provides an electrolyte polymer for fuel cells, made of a perfluorocarbon polymer (which may contain etheric oxygen atoms) having ion exchange groups, characterized in that the value calculated by dividing an absorption area $S_{CH}$ derived mainly from a C—H bond in the range of from 3,100 cm$^{-1}$ to 2,800 cm$^{-1}$ by an absorption area $S_{CF}$ derived mainly from a C—F bond in the range of from 2,700 cm$^{-1}$ to 2,000 cm$^{-1}$, as measured by means of infrared spectrophotometry, is less than 0.005; an electrolyte membrane made of the electrolyte polymer; and a liquid composition comprising the electrolyte polymer and an organic solvent having an OH group.

Further, the present invention provides a membrane/electrode assembly for fuel cells, which comprises an anode and a cathode each having a catalyst layer comprising a catalyst and an electrolyte polymer, and an electrolyte membrane disposed therebetween, characterized in that at least one polymer among the polymer constituting the electrolyte membrane, the polymer contained in the catalyst layer of the anode and the polymer contained in the catalyst layer of the cathode, is made of the above-mentioned electrolyte polymer.

Further, the present invention provides a process for producing an electrolyte polymer for fuel cells which comprises a step of contacting fluorine gas with a perfluorocarbon polymer (which may contain etheric oxygen atoms) having precursor groups for ion exchange groups, and further steps of hydrolysis, treatment for conversion to an acid form and washing with water, to convert the precursor groups into ion exchange groups, characterized in that TOC (total organic carbon component) in water to be used in the steps of the hydrolysis, treatment for conversion to an acid form and washing with water is at most 500 ppb.

When ultrapure water having the water quality of the above range, is used as the water to be used in the step of converting the precursor groups for ion exchange groups into the ion exchange groups, it is possible to reduce the organic component in the electrolyte polymer, whereby it is possible to obtain an electrolyte polymer having the above-mentioned $S_{CH}/S_{CF}$ of less than 0.005. Here, in a case of contacting the polymer with an aqueous solution, such as in hydrolysis, water before it is mixed with a solute, should be ultrapure water of the above range. Here, in this specification, the precursor groups for ion exchange groups are meant for groups convertible to ion exchange groups by e.g. hydrolysis or treatment for conversion to an acid form, and —SO$_2$F groups or —SO$_2$Cl groups may, for example, be precursor groups for sulfonic groups (SO$_3$H groups).

Further, the present invention provides a process for producing an electrolyte polymer for fuel cells which comprises a step of contacting fluorine gas with a perfluorocarbon polymer (which may contain etheric oxygen atoms) having precursor groups for ion exchange groups, and further steps of hydrolysis, treatment for conversion to an acid form and washing with water, to convert the precursor groups to ion exchange groups, characterized in that, after any one of the steps of hydrolysis, treatment for conversion to an acid form and washing with water, a step of contacting the above perfluorocarbon polymer with an aqueous hydrogen peroxide solution is carried out, and in a step of contacting the above perfluorocarbon polymer with water after the step of contacting with the aqueous hydrogen peroxide solution, water having TOC (total organic carbon component) of at most 500 ppb is used as the water.

The polymer is contacted with an aqueous hydrogen peroxide solution before and after a step of converting the precursor groups to ion exchange groups or during such a step, and in a subsequent step, the ultrapure water of the above range is used as the water for contacting the polymer with the water or aqueous solution, whereby it is possible to reduce the organic component in the electrolyte polymer, and thus it is possible to obtain an electrolyte polymer having the above-mentioned $S_{CH}/S_{CF}$ of less than 0.005.

Further, the present invention provides a process for producing an electrolyte polymer for fuel cells which comprises steps of subjecting a perfluorocarbon polymer (which may contain etheric oxygen atoms) having precursor groups for ion exchange groups to hydrolysis, treatment for conversion to an acid form and washing with water, to convert the precursor groups to ion exchange groups, characterized in that, after any one of the steps of hydrolysis, treatment for conversion to an acid form and washing with water, a step of contacting the above perfluorocarbon polymer with hydrogen peroxide gas is carried out, and in a case of carrying out a step of contacting the above perfluorocarbon polymer with water after the step of contacting with the hydrogen peroxide gas, water having TOC (total organic carbon component) of at most 500 ppb is used as the water.

In such a process, it is also possible to contact is the perfluorocarbon polymer with hydrogen peroxide gas after the electrolyte polymer is formed into a membrane-shape.

Accordingly, the present invention further provides a process for producing an electrolyte membrane for fuel cells which comprises steps of subjecting a perfluorocarbon polymer (which may contain etheric oxygen atoms) having precursor groups for ion exchange groups to hydrolysis, treatment for conversion to an acid form and washing with water, to convert the precursor groups to ion exchange groups, and a step of membrane-forming to form of the above perfluorocarbon polymer into a membrane, characterized in that, after the step of the above film-forming, and further after any one of the steps of hydrolysis, treatment for conversion to an acid form and washing with water, the above perfluorocarbon polymer is contacted with hydrogen peroxide gas, and in a case of carrying out a step of contacting the above perfluorocarbon polymer with water after the step of contacting with the hydrogen peroxide gas, water having TOC (total organic carbon component) of at most 500 ppb is used as the water.

EFFECT OF THE INVENTION

The electrolyte polymer of the present invention is excellent in the durability since the content of an organic substance having a carbon-hydrogen bond is remarkably low, and accordingly, the electrolyte membrane made of the polymer or the membrane/electrode assembly for polymer electrolyte fuel cells having a catalyst layer containing the polymer, is excellent in the durability.

MEANING OF SYMBOLS 1, 3, 5 and 7: Pipings
2 and 6: Containers
4: Chamber
10: Water
11: Electrolyte membrane or its precursor membrane
12: Water

BEST MOST FOR CARRYING OUT THE INVENTION

In the present invention, it is necessary that the electrolyte polymer for fuel cells made of a perfluorocarbon polymer, contains substantially no organic substance having a carbon-hydrogen bond. By the presence of an organic substance having a carbon-hydrogen bond, deterioration of the electrolyte polymer made of a perfluorocarbon polymer is accelerated during operation of the fuel cell. Accordingly, the present inventors have had the organic substance (organic groups) in the electrolyte polymer reduced as far as possible, and as a result, it has been found that the durability of the electrolyte polymer can thereby be improved, and the present invention has been accomplished. Here, in this specification, the perfluorocarbon polymer is called a perfluorocarbon polymer even when it contains a small amount of an organic substance having a carbon-hydrogen bond or unstable terminal groups including H at molecular chain terminals.

In the present invention, as an index of the amount of the organic substance contained in the electrolyte polymer, the value ($S_{CH}/S_{CF}$) is adopted, which is calculated by quantifying spectra (ordinate represents absorbance) measured by infrared spectrophotometry, and dividing an absorption area $S_{CH}$ based on a peak derived mainly from a C—H bond in the range of from 3,100 cm$^{-1}$ to 2,800 cm$^{-1}$ by an absorption area $S_{CF}$ derived mainly from a C—F bond in the range of from 2,700 cm$^{-1}$ to 2,000 cm$^{-1}$. Further, such a value will be referred to as a normalized CH bond amount, and studies have been done to determine the range of such a value in which sufficient durability as an electrolyte polymer can be obtained. As a result, it has been found necessary that the normalized CH bond amount is less than 0.005.

Usually, by infrared spectrophotometry, the following two types are observed as absorbances derived from a C—H bond measured. Namely, the absorption due to C—H stretching vibration is observed in a range of from 3,100 cm$^{-1}$ to 2,800 cm$^{-1}$, and the absorption due to C—H transition vibration is observed in a range of from 1,500 cm$^{-1}$ to 1,300 cm$^{-1}$. The absorption due to C—H stretching vibration of from 3,100 cm$^{-1}$ to 2,800 cm$^{-1}$ is suitable for quantification of the present C—H bond since overlapping with other absorptions is relatively low. Therefore, such a range is adopted in the present invention. Further, with respect to the absorption derived from the C—F bond, the absorption due to a C—F stretching bond is observed in the vicinity of from 1,300 cm$^{-1}$ to 1,000 cm$^{-1}$, and its overtone is observed in the vicinity of from 2,700 cm$^{-1}$ to 2,000 cm$^{-1}$. This absorption of from 2,700 cm$^{-1}$ to 2,000 cm$^{-1}$ is also suitable for quantification of the present C—F bond since overlapping with other absorptions is relatively small. Therefore, such a range is adopted in the present invention.

Specifically, the absorption area $S_{CH}$ derived mainly from a C—H bond is meant for an area surrounded by the absorption observed in the range of from 3,100 cm$^{-1}$ to 2,800 cm$^{-1}$ and the baseline. In a case where plural types of organic substances derived from the C—H bond are contained, a plurality of absorptions are observed, and therefore, it is preferred to calculate the area as an area including all of them. Further, the absorption area derived mainly from the C—F bond is meant for an area surrounded by the absorption observed in the range of from 2,700 cm$^{-1}$ to 2,000 cm$^{-1}$ and the baseline. The normalized CH bond amount $S_{CH}/S_{CF}$ represents a relative C—H bond amount contained in the electrolyte polymer.

The normalized CH bond amount in the electrolyte polymer of the present invention is less than 0.005. If such a value exceeds 0.005, the amount of the organic substance having a C—H bond will be large, whereby the durability of the electrolyte polymer deteriorates. The normalized CH bond amount is more preferably less than 0.003, and the durability of the electrolyte polymer can be more improved as such a value is smaller.

Further, in the infrared spectrophotometry, measurement is carried out by converting ion exchange groups in the electrolyte polymer to a salt form by e.g. a metal. If they are not so converted, broad absorptions derived from water contained in the electrolyte polymer are observed in a wide range, whereby there will be a trouble in quantification of the C—H bond and the C—F bond. As a metal to be used for the conversion, an alkali metal such as sodium or potassium is preferred since the conversion ratio will thereby be high.

For the measurement in the infrared spectrophotometry, usually, the following two methods are available. One is a transmission method wherein infrared rays are transmitted through a sample, and the other is a reflection method wherein infrared rays are reflected on the surface of the sample. In order to detect a very small amount of the C—H bond contained in the electrolyte membrane, it is preferred to employ a transmission method having a high SN ratio (ratio of signal to noise).

As a measuring apparatus for infrared spectrophotometry, a usual infrared absorption spectrophotometer is used. In order to quantify a very small amount of the C—H bond, it is preferred to use an apparatus having a Fourier transforming function which can increase the SN ratio.

Figure 1:
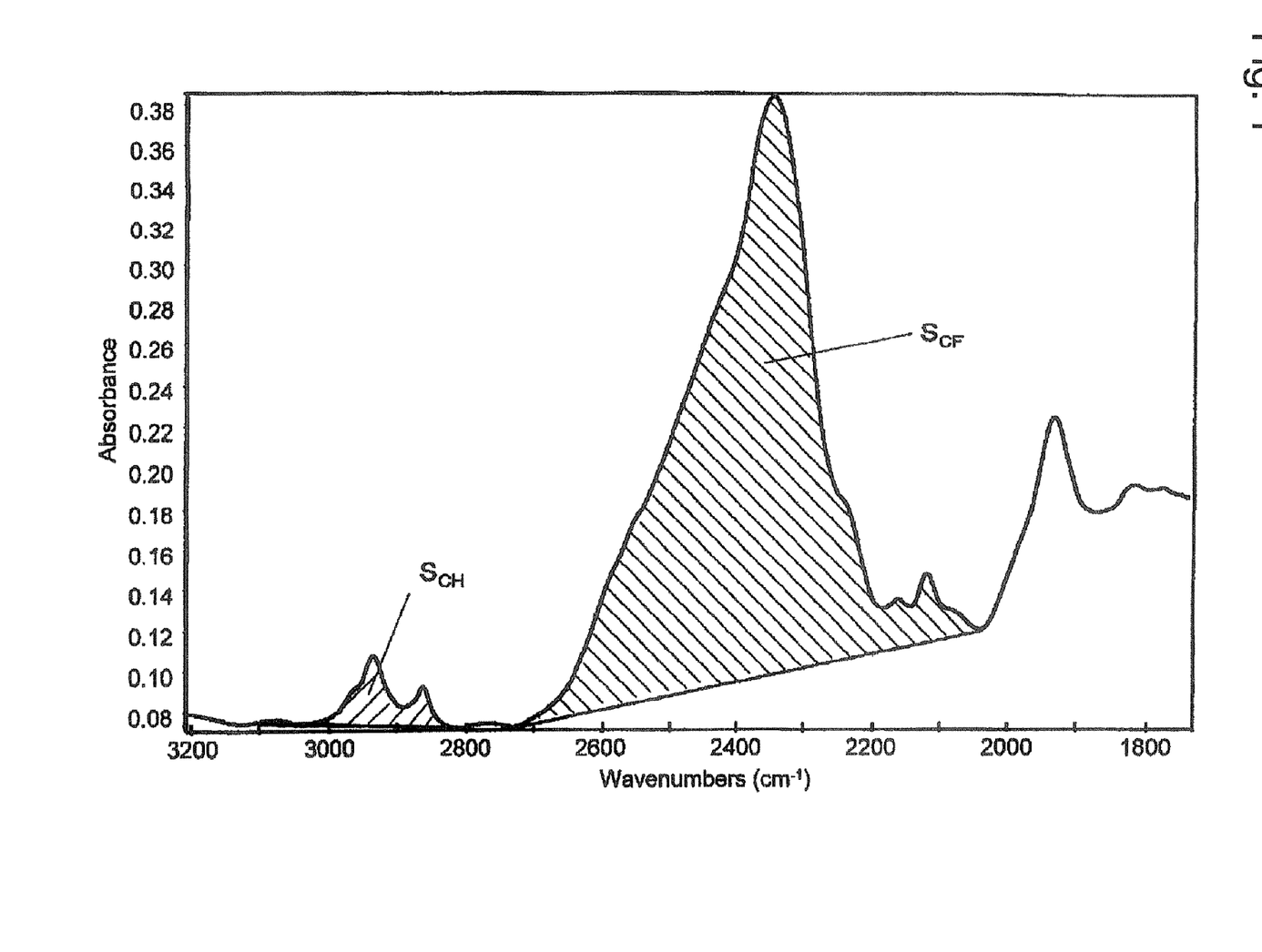
FIG. 1 is a graph showing infrared absorption spectra of the electrolyte membrane (electrolyte membrane K) obtained in Example 11, measured by a transmission method.

By employing infrared absorption spectra of the electrolyte polymer of the present invention, the above $S_{CH}$ and $S_{CF}$ will be specifically explained. FIG. 1 is a graph showing infrared absorption spectra of the electrolyte membrane (electrolyte membrane K) obtained in Example 11 in Examples mentioned below, as measured by means of a transmission method. The shaded area of absorption in the range of from 2,800 to 3,100 cm$^{-1}$ is $S_{CH}$. Here, the baseline represents a straight line connecting the position of 3,100 cm$^{-1}$ and the position of 2,800 cm$^{-1}$ in the spectra.

Further, $S_{CF}$ is the shaded area of absorption having a peak in the vicinity of from 2,000 to 2,700 cm$^{-1}$. Here, the baseline is a straight line connecting the bottom position of the peak in the vicinity of 2,000 cm$^{-1}$ and the bottom position which appears in the vicinity of 2,700 cm$^{-1}$.

The electrolyte polymer in the present invention is made of a perfluorocarbon polymer having ion exchange groups, and as the ion exchange groups, sulfonic groups, sulfonimide groups, phosphonic groups or the like may be used, and a perfluorocarbon polymer having sulfonic groups is particularly preferred. Further, the electrolyte membrane made of the electrolyte polymer of the present invention may be made of a single polymer, or may be a mixture of two or more polymers.

As the perfluorocarbon polymer having sulfonic groups, a variety of known polymers may be used. Especially, it is preferably a copolymer of a perfluorovinyl compound represented by the formula $CF_2=CF(OCF_2CFX)_m-O_p-(CF_2)_n SO_3H$ (wherein X is a fluorine atom or a trifluoromethyl group, m is an integer of from 0 to 3, n is an integer of from 0 to 12, and p is 0 or 1, provided that when n=0, p=0) with a perfluoroolefin, a perfluoroalkyl vinyl ether or the like. Specific examples of the perfluorovinyl compound are compounds represented by the following formulae 1 to 4. In the following formulae, q is an integer of from 0 to 9, r is an integer of from 1 to 8, s is an integer of from 0 to 8, and z is 2 or 3.

$CF_2=CFO(CF_2)_q SO_3H$     Formula 1

$CF_2=CFOCF_2CF(CF_3)O(CF_2)_r SO_3H$     Formula 2

$CF_2=CF(CF_2)_s SO_3H$     Formula 3

$CF_2=CF[OCF_2CF(CF_3)]_z O(CF_2)_2 SO_3H$     Formula 4

The polymer comprising polymerization units derived from a perfluorovinyl compound having a sulfonic group is usually obtained by polymerization of a perfluorovinyl compound having a —$SO_2F$ group and then converting the —$SO_2F$ groups into —$SO_3H$ groups. The perfluorovinyl compound having a —$SO_2F$ group is usually copolymerized with a comonomer such as a perfluoroolefin or a perfluoro (alkyl vinyl ether) because it is unlikely to undergo radical polymerization, though it may be polymerized alone. As the perfluoroolefin used as a comonomer, for example, tetrafluoroethylene, hexafluoropropylene or the like may be mentioned. Usually, the use of tetrafluoroethylene is preferred.

The perfluoro(alkyl vinyl ether) as a comonomer is preferably a compound represented by $CF_2=CF-(OCF_2CFY)_t-O-R^f$ wherein Y is a fluorine atom or a trifluoromethyl group, t is an integer of from 0 to 3, and $R^f$ is a linear or branched perfluoroalkyl group represented by $C_u F_{2u+1}$ ($1 \leq u \leq 12$), more specifically, compounds represented by the formulae 5 to 7. In the following formulae, v is an integer of from 1 to 8, w is an integer of from 1 to 8, and x is 2 or 3.

$CF_2=CFO(CF_2)_v CF_3$     Formula 5

$CF_2=CFOCF_2CF(CF_3)O(CF_2)_w CF_3$     Formula 6

$CF_2=CF[OCF_2CF(CF_3)]_x O(CF_2)_2 CF_3$     Formula 7

In addition to a perfluoroolefin or a perfluoro(alkyl vinyl ether), other fluorine-containing monomers such as 1,1,2,3,3,4,4-heptafluoro-4-[(trifluoroethenyl)oxy]-1-butene may be copolymerized with the perfluorovinyl compound having a —$SO_2F$ group as a comonomer.

In the present invention, the ion exchange capacity of the ion exchange resin is preferably from 0.5 to 2.0 meq/g dry resin, particularly preferably from 0.7 to 1.6 meq/g dry resin. If the ion exchange capacity is too low, the resistance will be large. On the other hand, if the ion exchange capacity is too high, the affinity to water will be too strong, whereby the electrolyte membrane tends to be dissolved at the time of power generation.

A production process of the electrolyte polymer is mainly composed of the following two steps.

(1) A polymerization step for a polymer (hereinafter referred to as a precursor polymer) having precursor groups for ion exchange groups.

(2) A treatment step for converting the precursor groups for ion exchange groups to ion exchange groups.

In the above steps, as factors for possible inclusion of an organic substance having a C—H bond, the following two factors are considered:

A. Inclusion of an organic substance from a chain transfer agent or a polymerization initiator at the time of polymerization for an electrolyte polymer.

B. Inclusion of an organic substance in water or in an organic solvent to be used in the treatment step for converting precursor groups for ion exchange groups into ion exchange groups.

For the polymerization for a precursor polymer, a conventional method such as bulk polymerization, solution polymerization, suspension polymerization or emulsion polymerization may be employed. The polymerization is carried out under such conditions that radicals will be formed, and it is common to employ a method of adding a radical initiator which is used in usual radical polymerization. The polymerization temperature is usually at a level of 20 to 150° C. The radical initiator may, for example, be a bis(fluoroacyl)peroxide, a bis(chlorofluoroacyl)peroxide, a dialkylperoxydicarbonate, a diacylperoxide, a peroxyester, an azo compound or a persulfate. In a case where one containing a hydrogen atom is used as such an initiator, a C—H bond based on the initiator will be incorporated in the polymer terminals. In order to prevent inclusion of the C—H bond, it is more preferred to use a perfluoro compound such as a perfluoroperoxyester compound represented by e.g. perfluorobutanoyl peroxide. Further, as a chain transfer agent, an alcohol such as methanol, a ketone such as acetone, or an ether is usually used. Even when such a chain transfer agent is used, a C—H bond will be incorporated in the polymer terminals.

In order to remove the C—H bond included at the time of such polymerization, it is effective to employ fluorination treatment wherein the precursor polymer is contacted and reacted with fluorine gas. At the polymer terminals, a —COF group, a —COOH group, a —CF=$CF_2$ group, etc. are present, and such fluorination treatment is effective also for stabilizing them.

The fluorine gas to be used in the fluorination treatment may usually be one diluted with inert gas such as nitrogen, helium or carbon dioxide so as to have a concentration of at least 0.1% and less than 100%, but such fluorine gas may be used without being diluted. It is possible to contact the polymer with fluorine gas in a bulk state or in a state where the polymer is dispersed or dissolved in a fluorine-containing solvent.

When the precursor polymer is contacted with the fluorine gas for fluorination, there is such a method that the precursor polymer is subjected to heat treatment for at least 0.1 hour at a temperature of from 200 to 300° C. under a reduced pressure of at most 0.02 MPa, and then contacted with fluorine gas at a temperature of from 150 to 200° C. Most unstable terminal groups such as —COOH groups or —CF=$CF_2$ groups present in some molecular chain terminals are firstly converted to —COF groups by heat treatment, and then converted to stable —$CF_3$ groups by treatment with fluorine gas. The reason why the heat treatment in a first step is preferably carried out under reduced pressure, is not clearly understood, but it is considered that the heat treatment under reduced pressure accelerates the conversion of functional groups, and the subsequent contact with fluorine gas in a second step increases the ratio of conversion to the stable —$CF_3$ groups.

The heat treatment temperature under reduced pressure is usually preferably from 200 to 300° C., more preferably from 220 to 280° C. If it is lower than 200° C., conversion of the unstable functional groups tends to be insufficient, such being undesirable. On the other hand, if it is higher than 300° C., precursor groups for the ion exchange groups tend to be decomposed during such treatment, thus leading to a decrease of the ion exchange capacity of the finally obtainable electrolyte polymer, such being undesirable. It is particularly preferably from 220 to 280° C., whereby conversion of the unstable functional groups will take place efficiently, while no decomposition of the —$SO_2F$ group will take place.

The pressure in the heat treatment under reduced pressure is preferably at most 0.02 MPa, more preferably at most 0.01 MPa. If it is more than 0.02 MPa, conversion of the unstable terminal functional groups may not efficiently be carried out. The heat treatment is preferably carried out under a pressure of at most 0.01 MPa, whereby conversion efficiency of the unstable terminal functional groups becomes remarkably high. The treatment time is preferably at least 0.1 hour, more preferably from 0.2 to 16 hours. If it is less than 0.1 hour, conversion of the unstable functional groups may not sufficiently be carried out. If it is more than 16 hours, such will be disadvantageous from the viewpoint of productivity. It is preferably from 0.2 to 16 hours, whereby the conversion of the unstable functional groups will be sufficient and the productivity can also be secured.

The above heat treatment under reduced pressure may be carried out in a reduced pressure oven, but may efficiently be carried out by means of a kneader such as a twin-screw extruder. In the case of using a reduced pressure oven, such heat treatment is preferably carried out by thinly and uniformly dispersing a polymer powder to be treated, on a fluorine-containing heat-resistant sheet of e.g. a perfluoro(alkyl vinyl ether). By such heat treatment, the polymer powder will be melted and formed into a sheet. The thickness of the sheet after the heat treatment is preferably at most 5 mm, whereby subsequent fluorine gas treatment will be sufficiently carried out. The thickness is further preferably at most 2 mm, whereby sufficient fluorination treatment can be carried out in a short period of time.

The fluorination treatment for contact with fluorine gas is usually carried out at a temperature of preferably from 150 to 200° C., more preferably from 170 to 190° C. If it is lower than 150° C., conversion of the —COF groups to the —$CF_3$ groups may not be sufficiently carried out. If it is higher than 200° C., decomposition of the precursor groups (—$SO_2F$ groups) is likely to take place and the ion exchange capacity of the finally obtainable electrolyte polymer is likely to be small. Fluorine gas is contacted preferably at a temperature of from 170 to 190° C., whereby no decomposition of the —$SO_2F$ groups will take place and the conversion into the —$CF_3$ groups will take place efficiently and sufficiently. The reaction of fluorine gas is a drastic exothermic reaction, and from the viewpoint of safety, the fluorine gas to be used is preferably diluted with inert gas such as nitrogen, and the pressure is preferably at a level of at most 1 MPa. After the fluorination treatment, the temperature is lowered, and unreacted fluorine gas is removed.

A reactor to be used at the time of contacting the polymer with fluorine gas is preferably a pressure-resistant reactor having an inside surface made of hastelloy C alloy. The reason is not clearly understood, but when a pressure-resistant reactor having an inside surface made of hastelloy C alloy is used, the conversion efficiency of the terminal unstable functional groups into stable functional groups at the time of fluorination treatment becomes high, such being desirable.

In the step of fluorination treatment, it is possible to carry out the fluorination by dissolving or dispersing the polymer in a fluorine-containing solvent. In such a case, as the fluorine-containing solvent, the following solvent may, for example, be used.

A polyfluorotrialkylamine compound such as perfluorotributylamine or perfluorotripropylamine.

A fluoroalkane such as perfluorohexane, perfluorooctane, perfluorodecane, perfluorododecane, perfluoro(2,7-dimethyloctane), 2H,3H-perfluoropentane, 1H-perfluorohexane, 1H-perfluorooctane, 1H-perfluorodecane, 1H,4H-perfluorobutane, 1H,1H,1H,2H,2H-perfluorohexane, 1H,1H,1H,2H,2H-perfluorooctane, 1H,1H,1H,2H,2H-perfluorodecane, 3H,4H-perfluoro(2-methylpentane) or 2H,3H-perfluoro(2-methylpetane).

A chlorofluoroalkane such as 3,3-dichloro-1,1,1,2,2-pentafluoropropane, 1,3-dichloro-1,1,1,2,2,3-pentafluoropropane or 1,1-dichloro-1-fluoroethane.

A polyfluorocycloalkane such as perfluorodecalin, perfluorocyclohexane, perfluoro(1,2-dimethylcyclohexane), perfluoro(1,3-dimethylcyclohexane), perfluoro(1,3,5-trimethylcyclohexane) or perfluorodimethylcyclobutane (regardless of structural isomers).

A polyfluoro-cyclic ether compound such as perfluoro(2-butyltetrahydrofuran).

A hydrofluoro ether such as n-$C_3F_7OCH_3$, n-$C_3F_7OCH_2CF_3$, n-$C_3F_7OCHFCF_3$, n-$C_3F_7OC_2H_5$, n-$C_4F_9OCH_3$, iso-$C_4F_9OCH_3$, n-$C_4F_9OC_2H_5$, iso-$C_4F_9OC_2H_5$, n-$C_4F_9OCH_2CF_3$, n-$C_5F_{11}OCH_3$, n-$C_6F_{13}OCH_3$, n-$C_5F_{11}OC_2H_5$, $CF_3OCF(CF_3)CF_2OCH_3$, $CF_3OCHFCH_2OCH_3$, $CF_3OCHFCH_2OC_2H_5$, or n-$C_3F_7OCF_2CF(CF_3)OCHFCF_3$, a fluorine-containing low molecular weight polyether, an oligomer of chlorotrifluoroethylene, and so on.

These solvents may be used alone or in combination as a mixture of two or more of them.

In addition to these solvents, wide variety of other compounds may be used. A chlorofluorocarbon such as 1,1,2-trichloro-1,2,2-trifluoroethane, 1,1,1-trichloro-2,2,2-trifluoroethane, 1,1,1,3-tetrachloro-2,2,3,3-tetrafluoropropane or 1,1,3,4-tetrachloro-1,2,2,3,4,4-hexafluorobutane can be technically used, but is not preferred with a view to protection of the global environment. In addition, it is possible to carry out the reaction by using liquid or supercritical carbon dioxide.

Among the above-mentioned solvents, a solvent containing a hydrogen atom is likely to be reacted with fluorine gas. Therefore, it is preferred to use a solvent containing no hydrogen atoms.

The treatment process for converting the precursor groups for ion exchange groups to ion exchange groups includes e.g. steps of hydrolysis, treatment for conversion to an acid form, washing treatment with water and drying treatment. As the step of hydrolysis, usually, the precursor groups for ion exchange groups are converted into a salt form by immersing the precursor polymer in an aqueous alkaline solution containing an organic solvent. As the organic solvent, it is possible to use an organic solvent in which the polymer to be treated is readily swelled, such as an alcohol such as methanol or ethanol, dimethylsulfoxide, or N,N-dimethylformamide. By using such an organic solvent, it is possible to let even the interior of the polymer be reacted. As the alkaline component, it is possible to use a strongly alkaline substance such as sodium hydroxide or potassium hydroxide. If the organic solvent used in the present step can not be removed by e.g. washing treatment as a subsequent step, it will cause inclusion of the C—H bond. Accordingly, in this step, it is preferred to carry out the treatment with an aqueous alkaline solution containing no organic solvent.

In the step of treatment for conversion to an acid form, ion exchange groups are converted from a salt form to an H form usually by immersing the above polymer in an aqueous acidic solution. As the acidic component, it is possible to use a strongly acidic substance such as sulfuric acid or hydrochloric acid. Further, the step of washing treatment with water is carried out to remove the organic solvent, the alkaline component and the acidic component used in the previous step from the electrolyte polymer. It is particularly preferred that the electrolyte polymer is efficiently contacted with new water so as to remove the organic solvent.

Here, in all the treatment steps for converting the precursor groups for ion exchange groups to ion exchange groups, the water to be used is preferably ultrapure water. As a water quality of the ultrapure water, TOC (Total Organic Carbon) is preferably at most 500 ppb, more preferably at most 100 ppb, particularly preferably at most 30 ppb. An organic substance contained in the water is one of the major causes of inclusion of an organic substance into the electrolyte polymer, and if water having high TOC is used, the durability of the electrolyte membrane polymer will be impaired. Further, various metal components also accelerate deterioration of the electrolyte polymer, and the smaller the amount of the metal components contained in water, the better. Therefore, the specific resistance of the above ultrapure water is preferably at least 10 MΩ·cm.

Further, in the step of hydrolysis or treatment for conversion to an acid form, the polymer is contacted with an aqueous solution having a solute dissolved, but the use of the ultrapure water in such a step means that the ultrapure water is used as water before the solute is dissolved.

Further, as a method for removing an organic substance included in the electrolyte polymer, a method of treatment with an aqueous hydrogen peroxide solution is also effective. By immersing of the electrolyte polymer having ion exchange groups converted to a salt-form or H-form in an aqueous hydrogen peroxide solution, it is possible to decompose and remove an organic substance having a C—H bond. The concentration of the aqueous hydrogen peroxide solution is preferably within a range of at least 0.1% and less than 30%. If it is less than 0.1%, the effect of decomposing the organic substance is insufficient, and if it is 30% or higher, the electrolyte polymer is likely to be decomposed. It is more preferably at least 1% and less than 10%. The temperature of the aqueous hydrogen peroxide solution at the time of contacting it with the electrolyte polymer is preferably at least 15° C. and less than 90° C. If it is less than 15° C., the effect of decomposing the organic substance is insufficient, and if it is 90° C. or higher, hydrogen peroxide is likely to be decomposed. It is more preferably at least 40° C. and less than 80° C.

The immersion time depends upon the thickness of the electrolyte polymer and the amount of the organic substance included, but for example, in a case where the electrolyte polymer is a membrane having a thickness of 50 μm, it is preferably at least 0.5 hour and less than 100 hours. If it is less than 0.5 hour, it is difficult to decompose an organic substance included in the interior of the membrane, and even if the immersion is carried out for 100 hours or longer, the effect of decomposing the organic substance cannot be expected any more. Such treatment with an aqueous hydrogen peroxide solution may be carried out after any one of the steps of hydrolysis, treatment for conversion to an acid form and washing with water, in the treatment steps for converting the precursor groups for ion exchange groups to ion exchange groups. However, in the case where such treatment is carried out after the treatment for conversion to an acid form or washing with water, there is a possibility that metal components contained in the aqueous hydrogen peroxide solution will be included in the electrolyte polymer, and thus, it is preferred that the treatment for conversion to an acid form or washing with water is carried out again after the treatment with the aqueous hydrogen peroxide solution. Further, in the step of contacting the polymer with water after the treatment with an aqueous hydrogen peroxide solution (such as treatment for conversion to an acid form or washing with water), ultrapure water is used as the water.

In the case of using an aqueous hydrogen peroxide solution, it is possible to convert precursor groups to ion exchange groups particularly by e.g. the following processes. A first process is a process of carrying out (1) hydrolysis, (2) conversion into an acid form, (3) washing with water, (4) treatment with an aqueous hydrogen peroxide solution, (5) conversion to an acid form and (6) washing with water in this order, wherein ultrapure was is used in steps (5) and (6). Here, the water quality of the water in steps (1) to (3) is not particularly limited. Further, a second process is a process of carrying out (1) hydrolysis, (1') washing with water, (2) treatment with an aqueous hydrogen peroxide solution, (3) conversion to an acid form and (4) washing with water in this order, wherein ultrapure water is used in steps (3) and (4). Here, the water quality of the water in steps (1) and (1') is not particularly limited, and it is possible to omit the washing with water of step (1') or change it to simple washing with water.

Further, in the treatment process for converting precursor groups for ion exchange groups to ion exchange groups, the method for removing an organic substance may be applied to an electrolyte membrane as it is in the shape of a membrane, as mentioned below. Namely, it is possible adopt the above-mentioned method as the process to preliminarily form a precursor polymer into a membrane-form and then convert the precursor groups into ion exchange groups.

Figure 2:
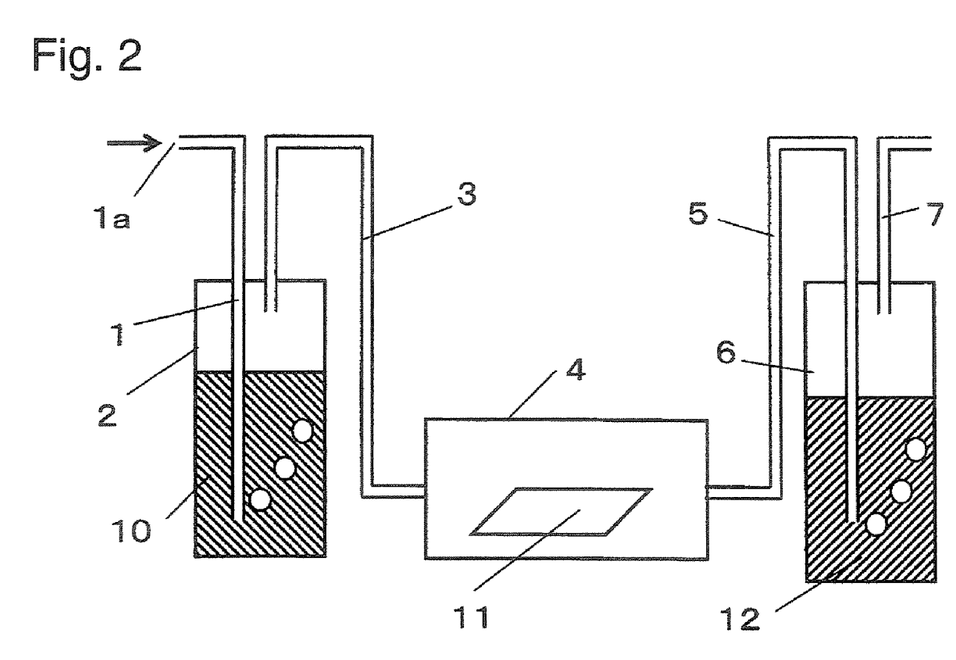
FIG. 2 is a view showing an embodiment for contacting an electrolyte membrane or its precursor membrane with hydrogen peroxide gas.

Further, as a method for removing an organic substance included in the electrolyte polymer, it is also effective to employ a method wherein the electrolyte polymer or its precursor polymer is contacted with hydrogen peroxide gas. The hydrogen peroxide gas may be contacted with an electrolyte membrane or a membrane of its precursor. Here, the membrane of its precursor is meant for a membrane which may be converted to an electrolyte membrane by hydrolysis, treatment for conversion to an acid form, or the like, and it is, for example, a membrane made of a polymer having —SO$_2$F groups or —SO$_2$Cl groups. The method of contacting the hydrogen peroxide gas with the electrolyte polymer, the precursor polymer, the electrolyte membrane or its precursor membrane is not particularly limited, but the method employing an apparatus shown in FIG. 2 is, for example, preferred. FIG. 2 is a view illustrating an embodiment to contact the electrolyte membrane or its precursor membrane with hydrogen peroxide gas. Further, it is possible to treat the electrolyte polymer or the precursor polymer which is not shaped by the apparatus in FIG. 2, and in such a case, instead of a membrane 11, e.g. a polymer placed on a tray may be put into a chamber 4. Now, treatment of a membrane will be described in detail.

In FIG. 2, a container 2 contains an aqueous hydrogen peroxide solution 10 and a container 6 contains water 12, and in a chamber 4, an electrolyte membrane or its precursor membrane 11 is placed. Into the container 2, carrier gas introduced from an inlet 1a is blown via a piping 1. The carrier gas is sufficiently incorporated with hydrogen peroxide gas in the container 2, and such gas is introduced to the chamber 4 via a piping 3 so that the hydrogen peroxide gas is contacted with the electrolyte membrane or its precursor membrane 11 in the chamber 4. Then, the gas discharged from the chamber 4 is introduced to the container 6 via a piping 5 and will be trapped by the water 12.

The concentration of the aqueous hydrogen peroxide solution 10 is preferably within a range of at least 0.1% and less than 50%. If it is less than 0.1%, an effect of decomposing the organic substance is insufficient, and if it is 50% or higher, the aqueous hydrogen peroxide solution 10 will be unstable, such being undesirable. It is more preferably at least 5% and less than 40%. The temperature of the aqueous hydrogen peroxide solution 10 is preferably at least 15° C. and lower than 90° C. If it is lower than 15° C., an effect of decomposing the organic substance will be insufficient, and if it is 90° C. or higher, hydrogen peroxide tends to be decomposed. It is more preferably at least 40° C. and less than 80° C. The temperature of the chamber 4 is preferably at least 15° C. and lower than 200° C. If it is lower than 15° C., an effect of decomposing the organic substance will be insufficient, and if it is 200° C. or higher, the electrolyte membrane tends to be decomposed. It is more preferably at least 40° C. and lower than 150° C. Further, it is necessary that the temperature of the chamber 4 is the same temperature as that of the aqueous hydrogen peroxide solution 10 or higher than that of the aqueous hydrogen peroxide solution 10. If the temperature of the chamber 4 is low, the hydrogen peroxide gas or water vapor will be condensed in the chamber 4. Further, for the same reason, it is necessary that the piping 3 is also warmed, and it is necessary that such a temperature is at least the temperature of the aqueous hydrogen peroxide solution 10.

The type of the carrier gas to be introduced from the piping 1 is not particularly limited, but inert gas such as nitrogen or argon is preferred. It is undesirable to employ the type of gas which is reactive with hydrogen peroxide or deteriorates the electrolyte membrane. Further, the flow rate of the carrier gas is also not particularly limited so long as the electrolyte membrane is contacted with the hydrogen peroxide gas.

Further, the treatment time of the electrolyte membrane or its precursor membrane 11 is optionally determined depending on the thickness of the membrane 11, the amount of the organic substance contained in the membrane 11, the concentration and temperature of the aqueous hydrogen peroxide solution 10, and the temperature of the chamber 4. For example, in a case where the thickness of the membrane 11 is 50 μm, the concentration of the aqueous hydrogen peroxide solution is 30 wt %, the temperature thereof is 60° C. and the temperature of the chamber 4 is 80° C., the treatment time is preferably at least 0.5 hour and less than 50 hours. If the treatment time is too short, it is difficult to decompose an organic substance included in the interior of the membrane 11, and if the treatment time is too long, the membrane 11 tends to be deteriorated.

Since such a method for exposing the membrane 11 to the hydrogen peroxide gas has no possibility of inclusion of metal components contained in hydrogen peroxide into the membrane 11, as compared with the above-mentioned method of immersion in an aqueous hydrogen peroxide solution, even in the case of treatment with hydrogen peroxide gas after the treatment for conversion to an acid form or washing with water, it is not necessary to carry out the treatment of conversion to an acid form or washing with water again after the treatment. Accordingly, particularly in a case where the hydrogen peroxide gas is contacted with the membrane 11 after washing with water, a step of contacting it with water is not included in subsequent steps, whereby it is not necessary to use water having TOC (Total Organic Carbon) of at most 500 ppb.

As another method for exposing the electrolyte membrane or its precursor membrane to the hydrogen peroxide gas, the following simple method is, for example, available. An electrolyte membrane and a Petri dish containing an aqueous hydrogen peroxide solution are put in a polytetrafluoroethylene-made container, which is then covered with a lid, and then the container is put in an oven, followed by heating. As compared with the above-mentioned process shown in FIG. 2, it is possible to simply treat the electrolyte membrane or its precursor membrane with the hydrogen peroxide gas.

Further, the method of treatment with the hydrogen peroxide gas can be applied also to a membrane/electrode assembly. Namely, a membrane/electrode assembly may be treated instead of the electrolyte membrane or its precursor membrane. Such treatment has an effect of reducing both organic impurities contained in a catalytic carbon in the electrode and organic substances included in the electrolyte membrane.

In a case where the electrolyte membrane or its precursor membrane is treated with hydrogen peroxide gas, it is not required to carry out a step of fluorination treatment by preliminarily contacting a polymer constituting the electrolyte membrane or its precursor membrane with the fluorine gas. However, in order to efficiently carry out the treatment by the hydrogen peroxide gas, it is preferred to preliminarily carry out the fluorination treatment.

The liquid composition of the present invention can be obtained by dissolving or dispersing an electrolyte polymer in a solvent. The present electrolyte polymer can be dissolved or dispersed suitably in a —OH group-containing organic solvent. Such a solvent is preferably an alcoholic —OH group-containing organic solvent. Specifically, methanol, ethanol, 1-propanol, 2,2,2-trifluoroethanol, 2,2,3,3,3-pentafluoro-1-propanol, 2,2,3,3-tetrafluoro-1-propanol, 4,4,5,5,5-pentafluoro-1-pentanol, 1,1,1,3,3,3-hexafluoro-2-propanol, 3,3,3-trifluoro-1-propanol, 3,3,4,4,5,5,6,6,6-nonafluoro-1-hexanol or 3,3,4,4,5,5,6,6,7,7,8,8,8-tridecafluoro-1-octanol may, for example, be mentioned. Further, as an organic solvent other than an alcohol, an organic solvent having a carboxyl group such as acetic acid, may also be used, but is not restricted thereto.

The —OH group-containing organic solvents may be used as a mixture of a plurality of such solvents, or may be used as mixed with water or with other fluorosolvents. As such other fluorosolvents, the same solvents may be exemplified as the fluorosolvents exemplified as preferred fluorosolvents when the present polymer is fluorinated in the fluorosolvent. When a mixed solvent is used, the content of the —OH group-containing organic solvent is preferably at least 10%, particularly preferably at least 20%, based on the total mass of the solvents.

In such a case, the present polymer may be dissolved or dispersed in the mixed solvent from the beginning. Otherwise, firstly, the present polymer may be dissolved or dispersed in the —OH group-containing organic solvent, and then, other solvents may be mixed thereto.

The dissolution or the dispersion is preferably carried out within a temperature range of from 0 to 250° C., particularly preferably within a range of from 20 to 150° C. under atmospheric pressure or under such a condition as closed and pressurized by e.g. an autoclave.

Further, the present polymer may be dissolved or dispersed in an alcoholic solvent having a boiling point lower than that of water, and then water may be added and the alcohol may be distilled off to prepare an aqueous dispersion containing substantially no organic solvent.

It is possible to prepare the electrolyte membrane of the present invention by various methods such as a coating method which comprises coating a base film with a liquid composition containing the electrolyte polymer, and drying the coating solution to vaporize the liquid components, or an extrusion method which comprises heating and melting a precursor polymer, extruding it into a film-form, followed by conversion to ion exchange groups.

As the method of coating a base film with a liquid composition, selection of the electrolyte polymer concentration or the liquid (solvent or dispersion medium) in the liquid composition allows adjustment of the thickness of the electrolyte membrane. However, in order to obtain a thick electrolyte membrane, the liquid composition may be applied and dried repeatedly to a prescribed film thickness. The coating method is not particularly limited, and specific examples include batch methods such as bar coating, spin coating and screen printing and continuous methods such as premetered methods and postmetered methods. In a postmetered method, a coating solution is applied in excess, and the excess of the coating solution is removed to a prescribed thickness. In a premetered method, the exact amount of a coating solution required to attain a prescribed thickness is applied. Postmetered methods include, for example, air doctor coating, blade coating, rod coating, knife coating, squeeze coating, dip coating and comma coating. Premetered methods include, for example, die coating, reverse roll coating, transfer roll coating, gravure coating, kiss-roll coating, cast coating, spray coating, curtain coating, calender coating and extrusion coating. In order to form a uniform electrolyte membrane, screen printing and die coating are preferred, and continuous die coating is preferred in view of production efficiency.

Here, the base film has a role of maintaining the shape of the electrolyte membrane and is required not to be dissolved in the coating solution and not to be melted at the time of drying each coating solution. Particularly, films made of the following materials are preferably used.

Fluorine-free polymers such as polyethylene terephthalate (hereinafter referred to as PET), polyethylene, polypropylene (hereinafter referred to as PP) and polyimide. Fluorine polymers such as polytetrafluoroethylene, an ethylene/tetrafluoroethylene copolymer, an ethylene/hexafluoropropylene copolymer, a tetrafluoroethylene/perfluoro(alkyl vinyl ether) copolymer and polyvinylidene fluoride.

Further, because the base film is eventually peeled, it is required to be readily peeled from the electrolyte membrane. From this point of view, the base film is preferably made of a fluorine polymer. Further, in the case of a film made of a fluorine-free polymer, the surface is preferably treated with a silicone releasant, a fluorine-type releasant or the like, and PET with a releasant-treated surface may, for example, be used preferably.

The above liquid composition applied to a base material may be dried by any methods without any particular restrictions, but is preferably dried by heating at or above the softening temperature of the electrolyte polymer, preferably continuously for efficient production of a polymer membrane. Particularly, it is preferred to pass the coated base material through an oven maintained at from 100 to 200° C. for a retention time of from 3 minutes to 2 hours.

As the extrusion method, particularly, preparation is preferably carried out by the following procedure.

(1) Kneading and pelletizing by twin-screw extrusion of the precursor polymer having precursor groups for ion exchange groups.

(2) Formation of a film by single-screw extrusion using the above pellets.

(3) Hydrolysis, treatment for conversion to an acid form, washing with water and drying.

The above steps (1) to (3) will be described in further detail.

First, a powdery precursor polymer is pelletized by twin-screw extrusion. Then, pellets obtained are formed into a film by single-screw extrusion preferably under heating in step (2). Otherwise, the above mixture may be directly subjected to single-screw extrusion without via the step of pelletizing, and may be formed into a film in the step of such single-screw extrusion. In the case of single-screw extrusion under heating, it is preferred that the extrusion is carried out so that the film temperature is from about 200 to about 270° C. If the film temperature is lower than 200° C., the discharge pressure will be too high, whereby the productivity is likely to decrease. If the film temperature exceeds 270° C., the surface of a film obtainable will be rough, and the thickness of the film will be nonuniform, such being undesirable. Then, in the same manner as mentioned above, (3) hydrolysis, treatment for conversion to an acid form, washing with water and drying are carried out for conversion to ion exchange groups.

The electrolyte membrane of the present invention may contain a variety of reinforcing materials. Such a reinforcing material may, for example, be a porous material, a short fiber, a non-woven fabric or a woven fabric made of polytetrafluoroethylene, an ethylene/tetrafluoroethylene copolymer, an ethylene/hexafluoropropylene copolymer, a tetrafluoroethylene/perfluoro(alkyl vinyl ether) copolymer, polyvinylidene fluoride, polyimide, polysulfone, polyether sulfone or polyether ether ketone.

The membrane/electrode assembly for fuel cells of the present invention comprises an anode and a cathode each having a catalyst layer comprising a catalyst and an electrolyte polymer, and an electrolyte membrane disposed therebetween, and at least one polymer among the polymer constituting the above electrolyte membrane, the polymer contained in the above anode catalyst layer and the polymer contained in the above cathode catalyst layer, is made of the electrolyte polymer of the present invention.

Such a membrane/electrode assembly for fuel cells can be obtained in accordance with conventional methods, for example, as follows. First, a conductive carbon black powder carrying particles of a platinum catalyst or a platinum alloy catalyst, is mixed with a liquid composition containing an electrolyte polymer to obtain a uniform dispersion, and gas diffusion electrodes are formed, by any one of the following methods, thereby obtaining a membrane/electrode assembly.

The first method is a method of coating both surfaces of the electrolyte membrane with the above-mentioned dispersion, drying it, and then attaching two sheets of carbon cloth or carbon paper closely onto both sides. The second method is a method of applying the above-mentioned dispersion onto two sheets of carbon cloth or carbon paper, drying it, and then placing the two sheets on both sides of the above electrolyte membrane while keeping the surfaces coated with the dispersion in close contact with the electrolyte membrane. The third method is a method of coating a separately-prepared base film with the above dispersion, drying it to form a catalyst layer, transferring an electrode layer on each side of an electrolyte membrane, and further attaching two sheets of carbon cloth or carbon paper closely onto both sides. The carbon cloth or carbon paper herein functions as gas diffusion layers to more uniformly diffuse the gas to the catalyst-containing layers, and functions as electricity collectors.

The resulting membrane/electrode assembly is interposed between separators having grooves as channels for a fuel gas or an oxidant gas, and then assembled in a cell to obtain a fuel cell. The separators may, for example, be electroconductive carbon plates.

For example, in the polymer electrolyte fuel cell, hydrogen gas is supplied to the anode, and oxygen or air is supplied to the cathode of the membrane/electrode assembly obtained by the above method. At the anode, a reaction represented by $H_2 \rightarrow 2H^+ + 2e^-$ takes place, and at the cathode, a reaction represented by $\frac{1}{2}O_2 + 2H^+ + 2e^- \rightarrow H_2O$ takes place to convert chemical energy to electric energy. Further, the present membrane/electrode assembly is applicable also to a direct methanol-type fuel cell.

EXAMPLES

Now, the present invention will be described in detail with reference to Examples of the present invention (Examples 1 to 4, 7 to 9, 13, 14, 16, 17, 19 and 20) and Comparative Examples (Examples 5, 6, 10 to 12, 15 and 18). However, it should be understood that the present invention is by no means restricted thereto.

In the following Examples, the following abbreviations are used.

PSVE: $CF_2=CFOCF_2CF(CF_3)OCF_2CF_2SO_2F$,

TFE: $CF_2=CF_2$

AIBN: $(CH_3)_2C(CN)N=N(CN)C(CH_3)_2$

Perfluoro initiator X: $(C_3F_7OCF(CF_3)CF_2OCF(CF_3)COO)_2$

PFB: $CF_3CF_2CF_2COO-OOCCF_2CF_2CF_3$

HCFC141b: $CH_3CCl_2F$

HCFC225cb: $CClF_2CF_2CHClF$

Example 1

[Polymerization for TFE/PSVE Copolymer A]

Into an autoclave having a capacity of 200 ml, 100 g of PSVE and 70 mg of AIBN were put, and after deaeration, TFE was filled so that the pressure would be 1.1 MPa. Then, the temperature was raised to 70° C., and polymerization was initiated with stirring. TFE was continuously fed so that the pressure would be kept at 1.1 MPa during the polymerization. After 10 hours, cooling and purging were carried out to stop the polymerization. After dilution with HCFC225cb, HFC141b was poured thereto to precipitate the polymer, which was further washed once with HCFC141b. After filtration, vacuum drying was carried out at 80° C. for 16 hours to obtain 29.5 g of a white polymer. The content of sulfur was determined by an elemental analysis, and the ion exchange capacity was determined, whereby it was found to be 1.00 meq/g dry resin. Hereinafter, such a polymer will be referred to as a copolymer A.

[Step of Fluorination Treatment]

2,800 g of the copolymer A was uniformly dispersed on a PFA sheet, followed by heat treatment in a reduced pressure oven under a pressure of 10 Pa at a temperature of 250° C. for 4 hours. The thickness of a sheet made of the copolymer A after the heat treatment was 2 mm. The infrared absorption spectra before and after the heat treatment under reduced pressure were compared, whereby the absorption attributable to a —COOH group at 1,780 cm$^{-1}$ and 1,810 cm$^{-1}$ and the absorption attributable to —CF=CF$_2$ at 1,800 cm$^{-1}$ were found to be decreased, and the absorption attributable to a —COF group at 1,880 cm$^{-1}$ was found to be increased by the heat treatment under reduced pressure.

On the other hand, into a pressure-resistant reactor having an inner capacity of 32 L and having an inside surface made of a hastelloy C alloy, a multistage shelf made of a hastelloy C alloy was put, and a mixed gas consisting of 20% of fluorine gas and 80% of nitrogen gas was introduced under a gage pressure of 0.25 MPa. The reaction system was maintained at 190° C. for 4 hours to carry out passivation treatment of the metal surface. After lowering the temperature, the sheet which was subjected to the above heat treatment under reduced pressure, was put on the shelf in the above 32 L pressure-resistant reactor, and a mixed gas consisting of 20% of fluorine gas and 80% of nitrogen gas was introduced under a gage pressure of 0.25 MPa. The reaction system was maintained at 180° C. for 4 hours to carry out fluorination treatment. After the treatment, fluorine gas was discharged and a polymer was taken out and pulverized by a pulverizer to obtain a fluorination-treated polymer having —SO$_2$F groups as precursor groups for sulfonic groups (hereinafter referred to as a precursor polymer). This polymer will be referred to as a precursor polymer A.

[Step of Treatment to Convert —SO$_2$F Groups to Sulfonic Groups]

The copolymer A was hydrolyzed in an aqueous solution containing 20% of methanol and 10% of potassium hydroxide, washed with sulfuric acid to be converted to an acid form and further washed with water, to convert —SO$_2$F groups to sulfonic groups thereby to obtain an acid-form polymer A. The water quality of the water used in such treatment steps was such that the specific resistance was 18 MΩ cm and TOC was 50 ppb.

[Determination of a Normalized CH Bond by an Infrared Absorption Spectra]

The acid-form polymer A was immersed in a 1N-KOH solution and was converted to a K-form, and it was further washed with water. The water used in this step had a specific resistance of 18 MΩ·cm and TOC of 10 ppb. Then, the resultant was dried for 1 hour in an over at a temperature of 110° C., and measured by an infrared absorption spectrum measuring apparatus (manufactured by Thermo Electron K.K., FT-IR Nicolet Avatar 370). The normalized CH bond amount was calculated by dividing an absorption area $S_{CH}$ derived mainly from a C—H bond in the range of from 3,100 cm$^{-1}$ to 2,800 cm$^{-1}$ by an absorption area $S_{CF}$ derived mainly from a C—F bond in the range of from 2,700 cm$^{-1}$ to 2,000 cm$^{-1}$, of the spectra obtained. The results are shown in Table 1.

Normalized CH Bond Amount=$S_{CH}/S_{CF}$.

[Step of Preparation of Electrolyte Solution]

The acid-form polymer A was dispersed in ethanol by means of a pressure resistant autoclave having an inside surface made of hastelloy C alloy, to obtain a 10% ethanol solution. This will be referred to as an electrolyte solution A.

[Step of Preparation of Electrolyte Membrane and Measurement of Normalized CH Bond Amount of Electrolyte Membrane]

The electrolyte solution A was cast on a substrate (hereinafter referred to as "ETFE substrate") made of an ethylene tetrafluoroethylene copolymer, and then dried to obtain a cast membrane having a thickness of 50 μm. The membrane obtained was subjected to heat treatment at 120° C. for 0.5 hour to obtain an electrolyte membrane A. This electrolyte membrane A was also converted to a K-form in the same manner as in the acid-form polymer A, and then the normalized CH bond amount was determined. The results are shown in Table 1.

[Step of Preparation of MEA]

126 g of water was added to 20 g of a catalyst having 50% of platinum supported on a carbon black powder, and ultrasonic waves were applied for 10 minutes to disperse the catalyst uniformly. 80 g of the above electrolyte solution A was added thereto, and 54 g of ethanol was further added to bring the solid content concentration to 10%, thereby to obtain a coating liquid for preparing a cathode catalyst layer. Such a coating liquid was applied on an ETFE substrate film and dried to form a cathode catalyst layer having a platinum amount of 0.5 mg/cm$^2$.

Further, 124 g of water was added to 20 g of a catalyst having 53% of a platinum/ruthenium alloy (platinum/ruthenium ratio=30/23) supported on a carbon black powder, and ultrasonic waves were applied for 10 minutes to disperse the catalyst uniformly. 75 g of the electrolyte solution A was added thereto, and 56 g of ethanol was further added to bring the solid content concentration to about 10%, thereby to obtain a coating liquid for preparing an anode catalyst layer. Such a coating liquid was applied on an ETFE substrate film and dried to form an anode catalyst layer having a platinum amount of 0.35 mg/cm². The water used for both coating liquid for preparing a cathode catalyst layer and coating liquid for preparing an anode catalyst layer, had a specific resistance of 18 MΩ·cm and TOC of 10 ppb.

The above electrolyte membrane A was sandwiched between the cathode catalyst layer and the anode catalyst layer, and pressed by hot press (the pressing conditions: 120° C., 2 minutes, 3 MPa) to bond both catalyst layers to the membrane. Then, the substrate films were peeled off to obtain a membrane/catalyst layer assembly having an electrode area of 25 cm². Such an assembly will be referred to as a membrane/electrode assembly A.

[Evaluation for Accelerated Durability of Membrane/Electrode Assembly]

The membrane/electrode assembly A was assembled into a cell for generation of electric power, hydrogen was supplied to the anode, and air was supplied to the cathode under ordinary pressure, respectively, in such a manner that the flow rate would be 50 ml/min, and such gas was supplied to the cell as gas moistured to have a dew point of 73° C. The cell temperature was kept at 120° C. and the current density was kept at 0 A/cm², namely in an open circuit state, the open circuit voltage was recorded. A test was terminated at a stage where the open circuit voltage became lower than 0.7 V, and weight reduction of the membrane/electrode assembly (excluding a catalyst component, calculated as electrolyte membrane+ electrolyte polymer for electrode) was measured. Then, the weight reduction rate was calculated by the following formula, and the resistance performance of the membrane/electrode assembly was evaluated. The results are shown in Table 2.

Weight reduction rate (%/h)=weight reduction (%)/ testing time (h)

Example 2

An acid-form polymer B, an electrolyte membrane B and a membrane/electrode assembly B are obtained in the same manner as in Example 1 except that, in a step of treatment to convert —SO₂F groups to sulfonic groups in Example 1, the water quality of the water used is changed to have specific resistance of 18 MΩ·cm and TOC of 10 ppb. Table 1 shows the normalized CH bond amounts and Table 2 shows results of the resistance performance of the membrane/electrode assembly at the time of evaluation in the same manner as in Example 1.

Example 3

An acid-form polymer C, an electrolyte membrane C and a membrane/electrode assembly C are obtained in the same manner as in Example 2 except that, in a step of treatment to convert —SO₂F groups to sulfonic groups in Example 2, hydrolytic solution used is changed to a 30% potassium hydroxide solution. Table 1 shows the normalized CH bond amounts and Table 2 shows the results of the resistance performance of the membrane/electrode assembly at the time of evaluation in the same manner as in Example 1.

Example 4

An acid-form polymer D, an electrolyte membrane D and a membrane/electrode assembly D are obtained in the same manner as in Example 3 except that treatment with an aqueous hydrogen peroxide solution is carried out after a step of treatment to convert —SO₂F groups to sulfonic groups in Example 3. Table 1 shows the normalized CH bond amounts and Table 2 shows the results of the resistance performance of the membrane/electrode assembly. The treatment with the aqueous hydrogen peroxide solution is carried out in such a manner that an acid-form polymer is immersed in a 5% aqueous hydrogen peroxide solution at 80° C. for 24 hours, and then treatment for conversion to an acid form is carried out by washing with sulfuric acid, followed by further washing with water. The water used in the treatment with aqueous hydrogen peroxide solution and subsequent treatment for conversion to an acid form and washing with water, has specific resistance of 18 MΩ·cm and TOC of 10 ppb.

Example 5

An acid-form polymer E, an electrolyte membrane E and a membrane/electrode assembly E were obtained in the same manner as in Example 2 except that a step of fluorination treatment in Example 2 was not carried out. Table 1 shows a normalized CH bond amounts and Table 2 shows the results of the resistance performance of the membrane/electrode assembly at the time of evaluation in the same manner as in Example 1.

Example 6

An acid-form polymer F, an electrolyte membrane F and a membrane/electrode assembly F are obtained in the same manner as in Example 2 except that, in a step of treatment to convert —SO₂F groups to sulfonic groups in Example 2, the water quality of water used is changed to specific resistance of 10 MΩ·cm and TOC of 1,300 ppb. Table 1 shows a normalized CH bond amounts and Table 2 shows the results of the resistance performance of the membrane/electrode assembly at the time of evaluation in the same manner as in Example 1.

Example 7

The copolymer A obtained in Example 1 was kneaded and pelletized by a twin-extruder and then extruded into a sheet-form by means of a single-screw extruder to obtain a precursor membrane having a thickness of 50 μm. An electrolyte membrane G was obtained in the same manner as in Example 2 except that the composition of an aqueous alkali solution is changed to an aqueous solution containing 30 wt % of dimethylsulfoxide and 15 wt % of potassium hydroxide in Example 2. Then, by using the electrolyte membrane G a membrane/electrode assembly G, was obtained in the same manner as in Example 2. Table 1 shows a normalized CH bond amounts and Table 2 shows the results of the resistance performance of the membrane/electrode assembly at the time of evaluation in the same manner as in Example 1.

Example 8

An electrolyte membrane H and a membrane/electrode assembly H were obtained in the same manner as in Example 7 except that, in a step of treatment to convert —SO₂F groups to sulfonic groups in Example 7, hydrolytic solution used was changed to a 30% sodium hydroxide solution. Table 1 shows a normalized CH bond amounts and Table 2 shows the results of the resistance performance of the membrane/electrode assembly at the time of evaluation in the same manner as in Example 1.

Example 9

An electrolyte membrane I and a membrane/electrode assembly I were obtained in the same manner as in Example 8 except that the treatment with an aqueous hydrogen peroxide solution was carried out after a step of treatment to convert —SO₂F groups to sulfonic groups in Example 8. Table 1 shows a normalized CH bond amounts and Table 2 shows the results of the resistance performance of the membrane/electrode assembly at the time of evaluation in the same manner as in Example 1. The treatment with the aqueous hydrogen peroxide solution was carried out in such a manner that an electrolyte membrane was immersed in a 5% aqueous hydrogen peroxide solution at 80° C. for 24 hours, treatment for conversion to an acid form was carried out by washing with hydrochloric acid, and washing was further carried out with water. The water used in the treatment with the aqueous hydrogen peroxide solution, and subsequent treatment for conversion to an acid form and washing with water, has specific resistance of 18 MΩ·cm and TOC of 10 ppb.

Example 10

An electrolyte membrane J and a membrane/electrode assembly J were obtained in the same manner as in Example 7 except that a step of fluorination treatment in Example 7 was not carried out. Table 1 shows a normalized CH bond amounts and Table 2 shows the results of the resistance performance of the membrane/electrode assembly at the time of evaluation in the same manner as in Example 1.

Example 11

An electrolyte membrane K and a membrane/electrode assembly K were obtained in the same manner as in Example 10 except that, in a step of treatment to convert —SO₂F groups to sulfonic groups in Example 10, the water quality of water used was changed to specific resistance of 10 MΩ·cm and TOC of 1,300 ppb. Table 1 shows a normalized CH bond amounts and Table 2 shows the results of the resistance performance of the membrane/electrode assembly at the time of evaluation in the same manner as in Example 1.

Example 12

An electrolyte membrane L and a membrane/electrode assembly L are obtained in the same manner as in Example 7 except that, in a step of treatment to convert —SO₂F groups to sulfonic groups in Example 7, the water quality of water used, was changed to specific resistance of 10 MΩ·cm and TOC of 1,300 ppb. Table 1 shows the normalized CH bond amounts and Table 2 shows the results of the resistance performance of the membrane/electrode assembly at the time of evaluation in the same manner as in Example 1.

Example 13

[Polymerization of TFE/PSVE Copolymer M]

Into an autoclave having a capacity of 1,000 ml, 746 g of PSVE and 1.4 g of a perfluoro initiator X were put, and after deaeration, TFE was filled so that the pressure would be 0.3 MPa. Then, the temperature was kept at 10° C., and polymerization was initiated with stirring. TFE was continued to be fed so that the pressure would be kept at 0.3 MPa during the polymerization. After 8 hours, purge was carried out to stop the polymerization. After diluting with HCFC225cb, HFC141b was poured thereinto to precipitate the polymer, which was further washed once with HCFC141b. After filtration, vacuum drying was carried out at 80° C. for 16 hours to obtain 70.0 g of a white polymer. The content of sulfur was determined by an elemental analysis, and the ion exchange capacity was determined, and was found to be 1.18 meq/g dry resin. Hereinafter, the polymer obtained is referred to as a copolymer M.

An acid-form polymer M, an electrolyte membrane M and a membrane/electrode assembly M are obtained by subjecting the above copolymer M to treatment by the method in the same manner as in Example 5. Table 1 shows the normalized CH bond amounts and Table 2 shows the results of the resistance performance of the membrane/electrode assembly at the time of evaluation in the same manner as in Example 1.

Example 14

An acid-form polymer N, an electrolyte membrane N and a membrane/electrode assembly N are obtained in the same manner as in Example 13 except that, in a step of treatment to convert —SO₂F groups into sulfonic groups in Example 13, liquid to be used in hydrolysis is changed to a 30% potassium hydroxide solution. Table 1 shows the normalized CH bond amounts and Table 2 shows the results of the resistance performance of the membrane/electrode assembly at the time of evaluation in the same manner as in Example 1.

Example 15

An acid-form polymer O, an electrolyte membrane O and a membrane/electrode assembly O are obtained in the same manner as in Example 13 except that, in a step of treatment to convert —SO₂F groups to sulfonic groups in Example 13, water quality of water to be used is changed to specific resistance of 10 MΩ·cm and TOC of 1,300 ppb. Table 1 shows the normalized CH bond amounts and Table 2 shows the results of the resistance performance of the membrane/electrode assembly at the time of evaluation in the same manner as in Example 1.

Example 16

An electrolyte membrane P and a membrane/electrode assembly P are obtained by subjecting a copolymer M obtained in Example 13 to treatment by a method in the same manner as in Example 10. Table 1 shows the normalized CH bond amounts and Table 2 shows the results of the resistance performance of the membrane/electrode assembly at the time of evaluation in the same manner as in Example 1.

Example 17

An electrolyte membrane Q and a membrane/electrode assembly Q are obtained in the same manner as in Example 16 except that, in a step of treatment to convert —SO₂F to sulfonic groups in Example 16, liquid to be used in hydrolysis is changed to an aqueous 30% potassium hydroxide solution. Table 1 shows the normalized CH bond amounts and Table 2 shows the results of the resistance performance of the membrane/electrode assembly at the time of evaluation in the same manner as in Example 1.

Example 18

An electrolyte membrane R and a membrane/electrode assembly R are obtained in the same manner as in Example 16 except that, in a step of treatment to convert —SO₂F to sulfonic groups in Example 16, water quality of water to be used is changed to specific resistance of 10 MΩ·cm and TOC of 1,300 ppb. Table 1 shows the normalized CH bond amounts and Table 2 shows the results of the resistance performance of the membrane/electrode assembly at the time of evaluation in the same manner as in Example 1.

Example 19

An electrolyte membrane I and a membrane/electrode assembly S were obtained in the same manner as in Example 8 except that, after a step of treatment to convert —$SO_2F$ groups into sulfonic groups in Example 8, treatment with hydrogen peroxide gas was carried out. Table 1 shows the normalized CH bond amounts and Table 2 shows the results of the resistance performance of the membrane/electrode assembly at the time of evaluation in the same manner as in Example 1. Here, the treatment with hydrogen peroxide gas was carried out by the method shown in FIG. 2 under the following conditions. Namely, as the aqueous hydrogen peroxide solution 10, 30 wt % of aqueous hydrogen peroxide solution 10 heated to 60° C. was used, and nitrogen gas was introduced at a rate of 50 ml/min from the piping 1. Further, the electrolyte membrane 11 was placed in a state where the chamber 4 was heated to 80° C., and the electrolyte membrane 11 was contacted with hydrogen peroxide gas for 2 hours. The piping 3 was heated to 80° C. to prevent dropwise condensation in the piping 3, and further the gas discharged from the chamber 4 was subjected to bubbling in the water 12 to trap the hydrogen peroxide gas.

Example 20

An electrolyte membrane I and a membrane/electrode assembly T are obtained in the same manner as in Example 8 except that, after a step of treatment to convert —$SO_2F$ groups to sulfonic groups in Example 11, treatment with hydrogen peroxide gas is carried out. Table 1 shows the normalized CH bond amounts and Table 2 shows the results of the resistance performance of the membrane/electrode assembly at the time of evaluation in the same manner as in Example 1. Here, the treatment with hydrogen peroxide gas is carried out in the same manner as in Example 19 except that the treating time is changed to 5 hours.

TABLE 1

|  | Polymer | Normalized CH bond amount of acid-form polymer | Normalized CH bond amount of electrolyte membrane |
|---|---|---|---|
| Example 1 | A | 0.0031 | 0.0040 |
| Example 2 | B | 0.0022 | 0.0026 |
| Example 3 | C | 0.0013 | 0.0022 |
| Example 4 | D | 0.0009 | 0.0013 |
| Example 5 | E | 0.0079 | 0.0088 |
| Example 6 | F | 0.0352 | 0.0365 |
| Example 7 | G | — | 0.0018 |
| Example 8 | H | — | 0.0013 |
| Example 9 | I | — | 0.0009 |
| Example 10 | J | — | 0.0057 |
| Example 11 | K | — | 0.0352 |
| Example 12 | L | — | 0.0189 |
| Example 13 | M | 0.0026 | 0.0031 |
| Example 14 | N | 0.0018 | 0.0022 |
| Example 15 | O | 0.0414 | 0.0484 |
| Example 16 | P | — | 0.0013 |
| Example 17 | Q | — | 0.0009 |
| Example 18 | R | — | 0.0317 |
| Example 19 | S | — | 0.0005 |
| Example 20 | T | — | 0.0020 |

TABLE 2

|  | Membrane/ electrode assembly | Testing time | Weight reduction (%) | Weight reduction rate (%/h) |
|---|---|---|---|---|
| Example 1 | A | 164 | 12 | 0.07 |
| Example 2 | B | 108 | 5 | 0.05 |
| Example 3 | C | 70 | 2 | 0.03 |
| Example 4 | D | 158 | 4 | 0.03 |
| Example 5 | E | 65 | 18 | 0.28 |
| Example 6 | F | 60 | 12 | 0.20 |
| Example 7 | G | 67 | 2 | 0.03 |
| Example 8 | H | 160 | 8 | 0.05 |
| Example 9 | I | 162 | 2 | 0.01 |
| Example 10 | J | 107 | 23 | 0.21 |
| Example 11 | K | 21 | 28 | 1.33 |
| Example 12 | L | 45 | 8 | 0.18 |
| Example 13 | M | 155 | 6 | 0.04 |
| Example 14 | N | 181 | 4 | 0.02 |
| Example 15 | O | 108 | 20 | 0.19 |
| Example 16 | P | 170 | 5 | 0.03 |
| Example 17 | Q | 192 | 4 | 0.02 |
| Example 18 | R | 89 | 19 | 0.21 |
| Example 19 | S | 200 | 1 | 0.005 |
| Example 20 | T | 100 | 2 | 0.05 |

INDUSTRIAL APPLICABILITY

According to the present invention, it is possible to obtain a polymer electrolyte fuel cell having excellent resistance and stabilized high output due to the reduction of organic impurities having a C—H bond contained in an electrolyte membrane and an electrolyte polymer in an electrode.

The entire disclosure of Japanese Patent Application No. 2004-238460 filed on Aug. 18, 2004 including specification, claims, drawings and summary is incorporated herein by reference in its entirety.

What is claimed is:

1. An electrolyte polymer for fuel cells, made of a perfluorocarbon polymer, which optionally comprises etheric oxygen atoms, having ion exchange groups, wherein a value calculated by dividing an absorption area $S_{CH}$ derived mainly from a C—H bond in a range from 3,100 $cm^{-1}$ to 2,800 $cm^{-1}$ by an absorption area $S_{CF}$ derived mainly from a C—F bond in a range from 2,700 $cm^{-1}$ to 2,000 $cm^{-1}$, as measured by infrared spectrophotometry, is less than 0.005.

2. The electrolyte polymer according to claim 1, which is a cation exchange resin made of a perfluorocarbon polymer, which optionally comprises etheric oxygen atoms, having sulfonic acid groups.

3. The electrolyte polymer according to claim 2, which is a copolymer comprising polymerized units based on $CF_2$=$CF_2$ and polymerized units based on $CF_2$=$CF$—$(OCF_2CFX)_m$—$O_p$—$(CF_2)_n$—$SO_3H$, wherein X is a fluorine atom or a trifluoromethyl group, m is an integer from 0 to 3, n is an integer from 0 to 12, and p is 0 or 1, provided that p=0 when n=0.

4. A liquid composition comprising an electrolyte polymer and an organic solvent having an OH group, wherein the electrolyte polymer is made of an perfluorocarbon polymer, which optionally comprises etheric oxygen atoms, having ion exchange groups, wherein the value calculated by dividing an absorption area $S_{CH}$ derived mainly from a C—H bond in a range from 3,100 $cm^{-1}$ to 2,800 $cm^{-1}$ by an absorption area $S_{CF}$ derived mainly from a C—F bond in a range from 2,700 $cm^{-1}$ to 2,000 $cm^{-1}$, as measured by infrared spectrophotometry, is less than 0.005.

5. The liquid composition according to claim 4, wherein the electrolyte polymer is a cation exchange resin made of the perfluorocarbon polymer, which optionally comprises etheric oxygen atoms, having sulfonic acid groups.

6. The liquid composition according to claim 5, wherein the electrolyte polymer is a copolymer comprising polymerized units based on $CF_2=CF_2$ and polymerized units based on $CF_2=CF-(OCF_2CFX)_m-O_p-(CF_2)_n-SO_3H$, wherein X is a fluorine atom or a trifluoromethyl group, m is an integer from 0 to 3, n is an integer from 0 to 12, and p is 0 or 1, provided that p=0 when n=0.

7. An electrolyte membrane for fuel cells, which is made of a perfluorocarbon polymer, which optionally comprises etheric oxygen atoms, having ion exchange groups, wherein a value calculated by dividing an absorption area $S_{CH}$ derived mainly from a C—H bond in a range from 3,100 $cm^{-1}$ to 2,800 $cm^{-1}$ by an absorption area $S_{CF}$ derived mainly from a C—F bond in a range from 2,700 $cm^{-1}$ to 2,000 $cm^{-1}$, as measured by infrared spectrophotometry, is less than 0.005.

8. The electrolyte membrane according to claim 7, which is a cation exchange resin made of the perfluorocarbon polymer, which optionally comprises etheric oxygen atoms, having sulfonic acid groups.

9. The electrolyte membrane according to claim 8, which is a copolymer comprising polymerized units based on $CF_2=CF_2$ and polymerized units based on $CF_2=CF-(OCF_2CFX)_m-O_p-(CF_2)_n-SO_3H$, wherein X is a fluorine atom or a trifluoromethyl group, m is an integer from 0 to 3, n is an integer from 0 to 12, and p is 0 or 1, provided that p=0 when n=0.

10. A membrane/electrode assembly for fuel cells, which comprises an anode and a cathode each having a catalyst layer comprising a catalyst and an electrolyte polymer, and an electrolyte membrane disposed therebetween, wherein at least one polymer among the polymer constituting the electrolyte membrane, the polymer contained in the catalyst layer of the anode and the polymer contained in the catalyst layer of the cathode, is made of the electrolyte polymer as defined in claim 1.

11. The membrane/electrode assembly according to claim 10, wherein the electrolyte polymer is a cation exchange resin made of a perfluorocarbon polymer, which optionally comprises etheric oxygen atoms, having sulfonic acid groups.

12. The membrane/electrode assembly polymer according to claim 11, wherein the electrolyte polymer is a copolymer comprising polymerized units based on $CF_2=CF_2$ and polymerized units based on $CF_2=CF-(OCF_2CFX)_m-O_p-(CF_2)_n-SO_3H$, wherein X is a fluorine atom or a trifluoromethyl group, m is an integer from 0 to 3, n is an integer from 0 to 12, and p is 0 or 1, provided that p=0 when n=0.

13. A process for producing an electrolyte polymer for fuel cells, the process comprising:
contacting fluorine gas with a perfluorocarbon polymer, which optionally comprises etheric oxygen atoms, having precursor groups for ion exchange groups, and
further hydrolyzing, treating for conversion to an acid form, and washing with water, thereby converting the precursor groups to ion exchange groups,
wherein a total organic carbon component (TOC) in water to be used in the hydrolyzing is at most 500 ppb.

14. The process for producing an electrolyte polymer for fuel cells according to claim 13, wherein a value of the polymer obtainable after the conversion of the precursor groups to ion exchange groups, calculated by dividing an absorption area $S_{CH}$ derived mainly from a C—H bond in a range from 3,100 $cm^{-1}$ to 2,800 $cm^{-1}$ by an absorption area $S_{CF}$ derived mainly from a C—F bond in a range from 2,700 $cm^{-1}$ to 2,000 $cm^{-1}$, as measured by infrared spectrophotometry, is less than 0.005.

15. A process for producing an electrolyte polymer for fuel cells, the process comprising:
contacting fluorine gas with a perfluorocarbon polymer, which optionally comprises etheric oxygen atoms, having precursor groups for ion exchange groups,
hydrolyzing, treating for conversion to an acid form, and washing with water, thereby converting the precursor groups to ion exchange groups, wherein, after at least one of said hydrolyzing, said treatment for conversion to an acid form, and said washing with water, contacting the perfluorocarbon polymer with an aqueous hydrogen peroxide solution is carried out, and further contacting the perfluorocarbon polymer with water after the contacting with the aqueous hydrogen peroxide solution, wherein water having a total organic carbon component (TOC) of at most 500 ppb is used as the water.

16. The process for producing an electrolyte polymer for fuel cells according to claim 15, wherein a value of the polymer obtainable after the conversion of the precursor groups to ion exchange groups, calculated by dividing an absorption area $S_{CH}$ derived mainly from a C—H bond in a range from 3,100 $cm^{-1}$ to 2,800 $cm^{-1}$ by an absorption area $S_{CF}$ derived mainly from a C—F bond in a range from 2,700 $cm^{-1}$ to 2,000 $cm^{-1}$, as measured by infrared spectrophotometry, is less than 0.005.

17. A process for producing an electrolyte polymer for fuel cells, the process comprising:
subjecting a perfluorocarbon polymer, which optionally comprises etheric oxygen atoms, having precursor groups for ion exchange groups to hydrolysis, treating for conversion to an acid form, and washing with water, to convert the precursor groups to ion exchange groups,
wherein, after at least one of said hydrolysis, said treatment for conversion to an acid form, and said washing with water, contacting the perfluorocarbon polymer with hydrogen peroxide gas is carried out, and further contacting the perfluorocarbon polymer with water after the contacting with the hydrogen peroxide gas, wherein water having a total organic carbon component (TOC) of at most 500 ppb is used as the water.

18. The process for producing an electrolyte polymer for fuel cells according to claim 17, wherein the perfluorocarbon polymer is contacted with fluorine gas before the hydrolysis.

19. The process for producing an electrolyte polymer for fuel cells according to claim 17, wherein a value of the polymer obtainable after the conversion of the precursor groups to ion exchange groups, calculated by dividing an absorption area $S_{CH}$ derived mainly from a C—H bond in a range from 3,100 $cm^{-1}$ to 2,800 $cm^{-1}$ by an absorption area $S_{CF}$ derived mainly from a C—F bond in a range from 2,700 $cm^{-1}$ to 2,000 $cm^{-1}$, as measured by infrared spectrophotometry, is less than 0.005.

20. The process for producing an electrolyte polymer for fuel cells according to claim 19, wherein the perfluorocarbon polymer is contacted with fluorine gas before the hydrolysis.

21. A process for producing an electrolyte membrane for fuel cells, the process comprising:
subjecting a perfluorocarbon polymer, which optionally comprises etheric oxygen atoms, having precursor groups for ion exchange groups to hydrolysis, treating for conversion to an acid form, and washing with water, thereby converting the precursor groups to ion exchange groups, and membrane-forming to form of the perfluorocarbon polymer into a membrane, wherein, after the membrane-forming, and further after at least one said hydrolysis, said treatment for conversion to an acid form, and said washing with water, the perfluorocarbon polymer is contacted with hydrogen peroxide gas, wherein in contacting the perfluorocarbon polymer with water after contacting with the hydrogen peroxide gas, water having a total organic carbon component (TOC) of at most 500 ppb is used as the water.

22. The process for producing an electrolyte membrane for fuel cells according to claim 21, wherein the perfluorocarbon polymer is contacted with fluorine gas before the hydrolysis.

23. The process for producing an electrolyte membrane for fuel cells according to claim 22, wherein a value of the polymer obtainable the conversion of the precursor groups to ion exchange groups, calculated by dividing an absorption area $S_{CH}$ derived mainly from a C—H bond in a range from 3,100 cm$^{-1}$ to 2,800 cm$^{-1}$ by an absorption area $S_{CF}$ derived mainly from a C—F bond in a range from 2,700 cm$^{-1}$ to 2,000 cm$^{-1}$, as measured by infrared spectrophotometry, is less than 0.005.

24. The process for producing an electrolyte membrane for fuel cells according to claim 21, wherein a value of the polymer obtainable after the conversion of the precursor groups to ion exchange groups, calculated by dividing an absorption area $S_{CH}$ derived mainly from a C—H bond in a range from 3,100 cm$^{-1}$ to 2,800 cm$^{-1}$ by an absorption area $S_{CF}$ derived mainly from a C—F bond in a range from 2,700 cm$^{-1}$ to 2,000 cm$^{-1}$, as measured by infrared spectrophotometry, is less than 0.005.

* * * * *